United States Patent [19]

Hölzer

[11] Patent Number: 4,474,379

[45] Date of Patent: Oct. 2, 1984

[54] CENTRIFUGALLY-OPERATED RADIALLY-TRANSLATABLE SEAL RING

[75] Inventor: Helmut Hölzer, Weinheim, Fed. Rep. of Germany

[73] Assignee: Firma Carl Freudenberg, Weinheim, Fed. Rep. of Germany

[21] Appl. No.: 475,813

[22] Filed: Mar. 16, 1983

[30] Foreign Application Priority Data

Mar. 18, 1982 [DE] Fed. Rep. of Germany ....... 3209926

[51] Int. Cl.³ .......................... F16J 15/16; F16J 15/54
[52] U.S. Cl. ...................................... 277/25; 277/174; 277/177; 277/178
[58] Field of Search ................... 277/47, 48, 178, 174, 277/175, 25

[56] References Cited

U.S. PATENT DOCUMENTS

| 820,009 | 5/1906 | Patten | 277/175 |
|---|---|---|---|
| 2,480,116 | 8/1949 | Brummer | 277/178 X |
| 2,643,793 | 6/1953 | McIlroy et al. | 277/178 X |
| 2,647,002 | 7/1953 | Brummer | 277/178 |
| 2,719,743 | 10/1955 | Brummer et al. | 277/178 |
| 2,932,535 | 4/1960 | Peickii et al. | 277/227 X |
| 3,600,045 | 8/1971 | Inoue | 277/178 X |
| 3,704,893 | 12/1972 | Hill | 277/178 X |
| 3,885,460 | 5/1975 | Park | 277/178 X |

FOREIGN PATENT DOCUMENTS

| 1801320 | 7/1969 | Fed. Rep. of Germany | 277/178 |
|---|---|---|---|
| 277179 | 9/1927 | United Kingdom | 277/178 |
| 780114 | 7/1957 | United Kingdom | 277/178 |
| 827564 | 2/1960 | United Kingdom | 277/178 |

Primary Examiner—Robert S. Ward
Attorney, Agent, or Firm—Felfe & Lynch

[57] ABSTRACT

A radial shaft seal ring has a lip ring for sealing to a shaft for rotation therewith. A U-shaped recess extends around the lip ring. An extension portion of a reinforcing ring which delimits a space on one side thereof to be sealed contacts the U-shaped recess without pressure or connection for low wear relative rotation therein. Preferably, the shoulder of the lip ring defining the side of the U-shaped recess on the sealed-space side of the reinforcing ring has a greater outside diameter than that on the other side to centrifugally aid the seal. More preferably, the latter is done by angling the U-shaped channel to the sealed side to also accommodate axial vibration of the shaft and lip ring.

12 Claims, 2 Drawing Figures

CENTRIFUGALLY-OPERATED RADIALLY-TRANSLATABLE SEAL RING

BACKGROUND OF THE INVENTION

The invention relates to a radial shaft seal ring.

A radial shaft seal ring of this type is known from British Pat. No. 906,366. The lip ring is made of an elastomeric material and is vulcanized directly onto the inwardly directed extension of the reinforcing ring. Under operating conditions, the lip ring is at rest and its sealing lip wipes along the surface of the sealed shaft. It is therefore extremely prone to wear and can be expected to have a reasonably good service life only if the shaft surface is free of appreciable roughness. The shaft therefore requires careful finishing and its fabrication entails costly machining operations.

German Pat. No. 16 75 397 relates to a lip ring which rotates with the shaft and which, by a sealing lip that acts in the radial direction, bears on an annular surface of the housing which extends perpendicularly to the axis of rotation. Good sealing action can be secured in this case only if lip ring and housing are aligned with each other in a highly precise manner which is difficult to accomplish in the presence of vibration. This is why shaft seals of this type have not come into wide use.

SUMMARY OF THE INVENTION

The object of the invention is to provide a radial shaft seal ring which can be installed as a complete unit without requiring costly finishing of the shaft to be sealed or complicated adjustments, and which will provide efficient sealing over an extended period of time.

In accordance with the invention, this object is accomplished with a lip ring which receives between shoulders an inward extension of a reinforcing ring without initial tension or rigid connection therebetween.

The lip ring has an aperture which bears on the sealed shaft with elastic tension and is therefore entrained by the shaft as it rotates. Its shoulders, which hug the inwardly projecting extension of the reinforcing ring, are in contact with the latter without any special contact pressure being exerted with the result that no appreciable frictional forces are generated over this area. Wear in the area of the actual contact surfaces therefore is extremely low, and considerably less braking action is exerted on the rotating shaft than with the usual radial shaft seal rings of the type mentioned at the outset.

The proposed radial shaft seal ring can be installed as a complete unit, precise alignment of the parts which are movable relative to each other being achieved automatically. No special adjustments are required in any case.

The actual sealing lip of the seal ring is stationary on the surface of the rotating shaft and therefore is not subject to any wear in that area. The shaft surface requires no elaborate finishing.

The lip ring may be made of a thermoplastic material such as polypropylene. For high-temperature use, polytetrafluoroethylene has proved well suited, while for drive and engine applications generally the rubber-elastic materials commonly used in the manufacture of conventional radial shaft seal rings are employed. Combinations of different materials selected for their specific properties are readily possible. For example, it has been found highly advantageous to impart to the surfaces of the lip ring and/or of the extension of the reinforcing ring which are in sliding contact with each other friction-reducing properties by incorporating into them and/or coating them with polytetrafluoroethylene in finely divided compactly layered form.

In one advantageous embodiment, the shoulder facing the medium to be sealed has a larger outside diameter than the shoulder facing away from the medium to be sealed. The centrifugal force which has a decisive influence on the sealing action in such a design is then greater on the side of the medium to be sealed than on the outside, and leakage which penetrates into the seal clearance space is thus forced back into the sealed space.

The inwardly directed extension of the reinforcing ring may, in the vicinity of the shoulders, be inclined or domed in the direction of the medium to be sealed. Its configuration in this area may thus be said to be conical or flared. In all cases, the two surfaces extend parallel to each other. The lip ring is an all cases configured and conformed so that appreciable friction in the region of the surfaces which are in sliding contact is positively prevented after the seal has been installed.

In an embodiment of this type, it has proved advantageous for the shaft to be sealed and the extension of the reinforcing ring to make an angle ranging from 25 to 60 degrees in proximity to the shoulders. The preferred range is 35 to 45 degrees. Such a design readily permits both radial and axial motion of the shaft during its rotation to be accommodated.

The contact pressure of the sealing lip necessary to static sealing at the shaft surface can be produced by simple dimensional coordination with the shaft diameter as a function of the material used. With markedly resilient materials, such as polytetrafluoroethylene or thermoplastics, it will be advisable to use secondary contact-pressure means, for example, a garter spring as in British Pat. No. 906,366.

The radial shaft seal ring may be used as a primary seal, for example, to protect a radial shaft seal ring of conventional design against infiltration of gross dirt, dust or sand. Moreover, the proposed radial shaft seal ring may be used in a multiple, tandem arrangement, with a sealing liquid in the spaces between the individual rings permitting high-pressure sealing under graded pressure.

BRIEF DESCRIPTION OF THE DRAWING

The invention will now be described in greater detail with reference to two embodiments of the radial shaft seal ring which are illustrated in the accompanying drawing, wherein.

DETAILED DESCRIPTION OF THE INVENTION

Figure 1:
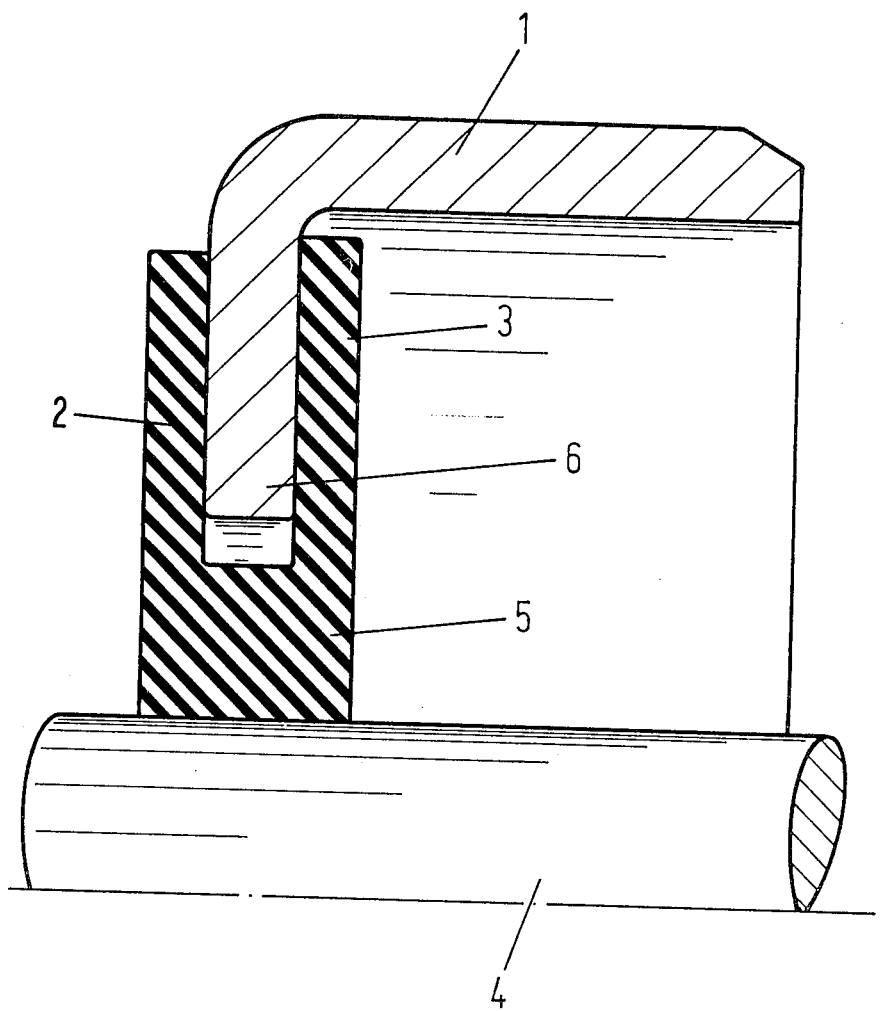
FIG. 1 shows a radial shaft seal ring, partly and in section, angled perpendicular to the shaft to be sealed.

The reinforcing ring 1 of the radial shaft seal ring of FIG. 1 is made of sheet steel of a thickness of 0.8 mm. The reinforcing ring is cup-shaped and has an inward extension 6 which makes a right angle with the sealed shaft 4. Slipped onto the extension 6 so formed is a lip ring 5, which has a U-shaped section. The dimensioning and the reciprocal coordination of the dimensions are such that the two shoulders 2 and 3 of the lip ring bear without appreciable contact pressure on the two faces of the extension 6. Radially there is a clearance on both sides so that the lip ring can be moved in the radial direction without appreciable difficulties.

The inside diameter of the lip ring 5 is coordinated with the outside diameter of the sealed shaft in such a way that reliable static sealing between the two parts is secured without the use of secondary pressure means, such as a garter spring. The lip ring is made of a rubber-elastic material having a Shore A hardness of 88. In a variant which is not shown, the pressure of the sealing lip against the sealed shaft is increased by means of a garter spring inserted in a groove. The garter spring in this case is dimensioned so that it does not affect the frictional conditions between the extension 6 and the two shoulders 2 and 3.

The outside diameter of the shoulder 3 facing the sealed medium 7 is slightly larger than that of the shoulder 2 disposed on the outside. The medium to be sealed thus is securely retained in the space to be sealed.

Figure 2:
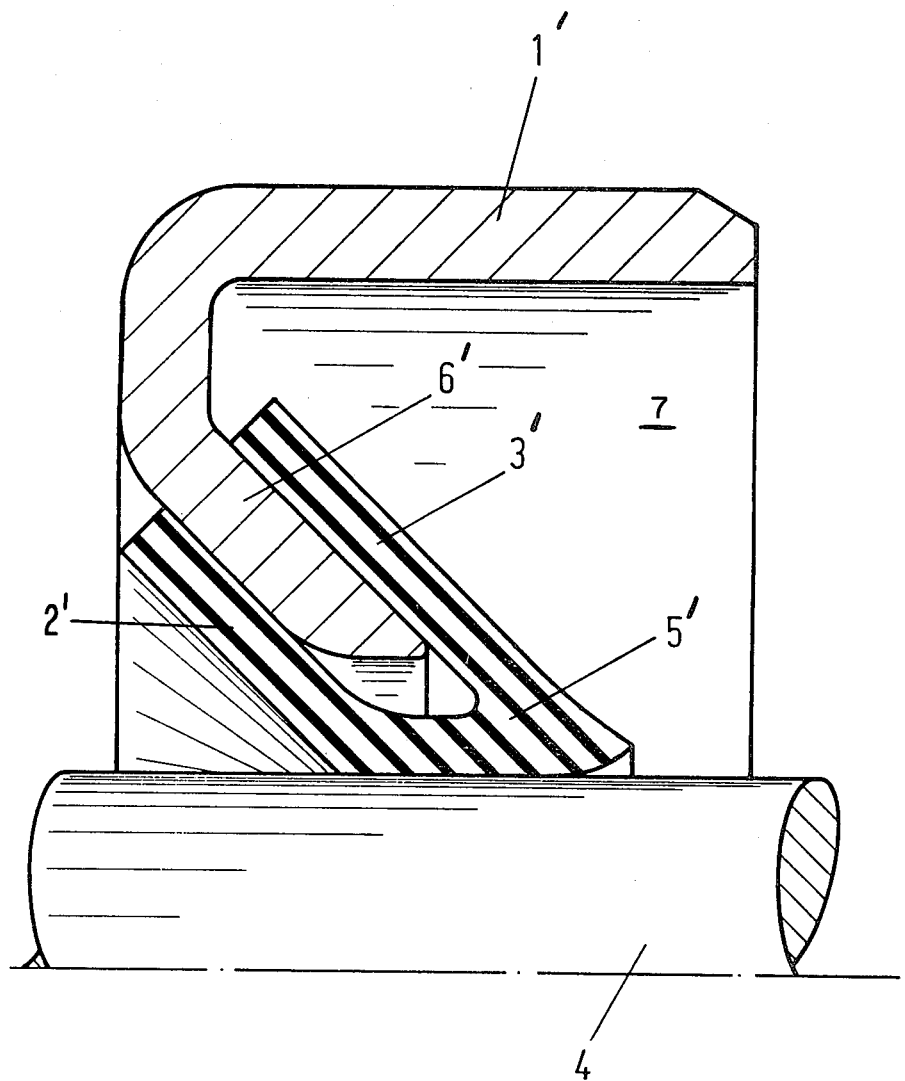
FIG. 2 shows similarly to FIG. 1 another ring at an angle of 45 degrees.

In the embodiment of FIG. 2, the inwardly directed extension 6' of the reinforcing ring is conically inclined in the direction of the sealed medium. It makes an angle of 45 degrees with the axis of rotation of the shaft 4.

Seated on said extension is a lip ring 5' which is capable of motion relative thereto. It is made of polytetrafluoroethylene and as a result of appropriate dimensioning bears on the surface of the sealed shaft 4 with sufficient pressure to assure a good static seal without the use of secondary pressure means.

The contact surfaces of the shoulders 2' and 3' which extend parallel to the surface of the extension 6' bear on the latter without appreciable pressure. As is apparent, the shoulder 3' has a considerably larger outside diameter than the shoulder 2', and leakage in the area of the surfaces in sliding contact is thus positively prevented. The shoulder 2' does not project beyond the reinforcing ring 1' in the axial direction, and this represents a big advantage in that it permits efficient installation at low cost. Adjustment following installation of the parts 1' and 5' which are movable relative to each other is not necessary.

It will be appreciated that the instant specification and claims are set forth by way of illustration and not of limitation, and that various changes and modifications may be made without departing from the spirit and scope of the present invention.

What is claimed is:

1. A radial shaft seal ring, comprising:
   a lip ring having an aperture for bearing on a shaft sealingly and entrainingly to rotate the lip ring with the shaft;
   shoulders on the lip ring having facing surfaces defining a generally U-shaped recess extending about the lip ring and toward the aperture; and
   a reinforcing ring for delimiting on one side thereof a space to be sealed about the shaft, the reinforcing ring having an extension portion projecting into the U-shaped recess and contacting a portion of the facing surfaces of the shoulders of the lip ring without tension or connection therebetween, whereby the lip ring can rotate with the shaft without wear against the shaft or reinforcing ring,
   the shoulder of the lip ring on the side of the reinforcing ring delimiting the space to be sealed having a larger outside diameter than the other shoulder, whereby to aid the sealing centrifugally.

2. A radial shaft seal ring as in claim 1, wherein the lip ring comprises a polymeric material at least at the aperture therein, whereby to seal to the shaft.

3. A radial shaft seal ring as in claim 1, wherein the facing surfaces of the shoulder define the U-shaped recess as also extending at an angle in the direction of the side of the reinforcing ring delimiting the space to be sealed, whereby to accommodate axial and radial vibration of the shaft and lip ring and provide a larger outside diameter to the shoulder on the one side to aid in the sealing centrifugally.

4. A radial shaft seal ring as in claim 2, wherein the facing surfaces of the shoulder define the U-shaped recess as also extending at an angle in the direction of the side of the reinforcing ring delimiting the space to be sealed, whereby to accommodate axial and radial vibration of the shaft and lip ring and provide a larger outside diameter to the shoulder on the one side to aid in the sealing centrifugally.

5. A radial shaft ring seal as in claim 3, and further comprising the shaft, and wherein the facing surfaces of the shoulders have an angle of from about 25° to about 60° to the axis of the shaft.

6. A radial shaft ring seal as in claim 4, and further comprising the shaft, and wherein the facing surfaces of the shoulders have an angle of from about 25° to about 60° to the axis of the shaft.

7. A radial shaft seal ring as in claim 1, and further comprising friction reducing means on at least one of the facing surfaces of the shoulders and the extension of the reinforcing ring for reducing friction therebetween.

8. A radial shaft seal ring as in claim 2, and further comprising friction reducing means on at least one of the facing surfaces of the shoulders and the extension of the reinforcing ring for reducing friction therebetween.

9. A radial shaft seal ring as in claim 3, and further comprising friction reducing means on at least one of the facing surfaces of the shoulders and the extension of the reinforcing ring for reducing friction therebetween.

10. A radial shaft seal ring as in claim 4, and further comprising friction reducing means on at least one of the facing surfaces of the shoulders and the extension of the reinforcing ring for reducing friction therebetween.

11. A radial shaft seal ring as in claim 5, and further comprising friction reducing means on at least one of the facing surfaces of the shoulders and the extension of the reinforcing ring for reducing friction therebetween.

12. A radial shaft seal ring as in claim 6, and further comprising friction reducing means on at least one of the facing surfaces of the shoulders and the extension of the reinforcing ring for reducing friction therebetween.

* * * * *